(12) United States Patent
Sato

(10) Patent No.: US 8,368,938 B2
(45) Date of Patent: Feb. 5, 2013

(54) REGISTERING A PLURALITY OF TASKS WITH RESPECT TO A DOCUMENT FOR PROCESSING

(75) Inventor: Tetsuya Sato, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 377 days.

(21) Appl. No.: 12/846,670

(22) Filed: Jul. 29, 2010

(65) Prior Publication Data

US 2011/0032566 A1  Feb. 10, 2011

(30) Foreign Application Priority Data

Aug. 4, 2009  (JP) ................................. 2009-181184

(51) Int. Cl.
*G06K 15/00* (2006.01)
*G06F 15/00* (2006.01)
*G06F 3/12* (2006.01)

(52) U.S. Cl. ........................ 358/1.16; 358/1.1; 358/1.15

(58) Field of Classification Search .................... 358/1.1, 358/1.15, 1.16
See application file for complete search history.

(56) References Cited

FOREIGN PATENT DOCUMENTS

JP  2005-262754 A   9/2005
JP  2006-001242 A   1/2006

*Primary Examiner* — Benny Q Tieu
*Assistant Examiner* — Eric A Rust
(74) *Attorney, Agent, or Firm* — Canon USA Inc. IP Division

(57) ABSTRACT

The present invention provides a user with information indicating an executable series of processing among the series of processing including a plurality of processes based on attribute information of acquired image data.

An information processing apparatus (i.e., a MFP) of the present invention acquires scanned image data and acquires the execution condition of the series of processing corresponding to the attribute information of the acquired image data. The information processing apparatus acquires a series of processing corresponding to the execution condition of the acquired series of processing. The information processing apparatus displays information indicating the acquired series of processing on a screen.

7 Claims, 16 Drawing Sheets

FIG.4A

| FLOW CONDITION ID | NUMBER | RESOLUTION | NUMBER OF PAGES | BUSINESS FORM TEMPLATE ID |
|---|---|---|---|---|
| 001 | 3 | 300*300 | 1 | temp_001 |
| | | | 2 | temp_002 |
| | | | 3 | NULL |
| 002 | 2 | 200*200 | 1 | temp_001 |
| | | | 2 | temp_003 |
| ⋮ | ⋮ | ⋮ | ⋮ | ⋮ |

| FLOW NAME | FLOW ID | DEFINITION FILE | FLOW CONDITION ID |
|---|---|---|---|
| FLOW 1 | flow_001 | FLOW 1.xml | 0001 |
| FLOW 2 | flow_002 | FLOW 2.xml | 0002 |
| FLOW 3 | flow_003 | FLOW 3.xml | 0001 |
| FLOW 4 | flow_004 | FLOW 4.xml | 0003 |
| ⋮ | ⋮ | ⋮ | ⋮ |

| BUSINESS FORM TEMPLATE ID | BUSINESS FORM DATA | FIELD ID | POSITION OF REGION |
|---|---|---|---|
| temp_001 | ... | f_001 | (sx1,sy1), (ex1,ey1) |
| | | f_002 | (sx2,sy2), (ex2,ey2) |
| | | f_003 | (sx3,sy3), (ex3,ey3) |
| temp_002 | ... | f_011 | (sx4,sy4), (ex4,ey4) |
| | | f_012 | (sx5,sy5), (ex5,ey5) |
| ⋮ | ⋮ | ⋮ | ⋮ |

205

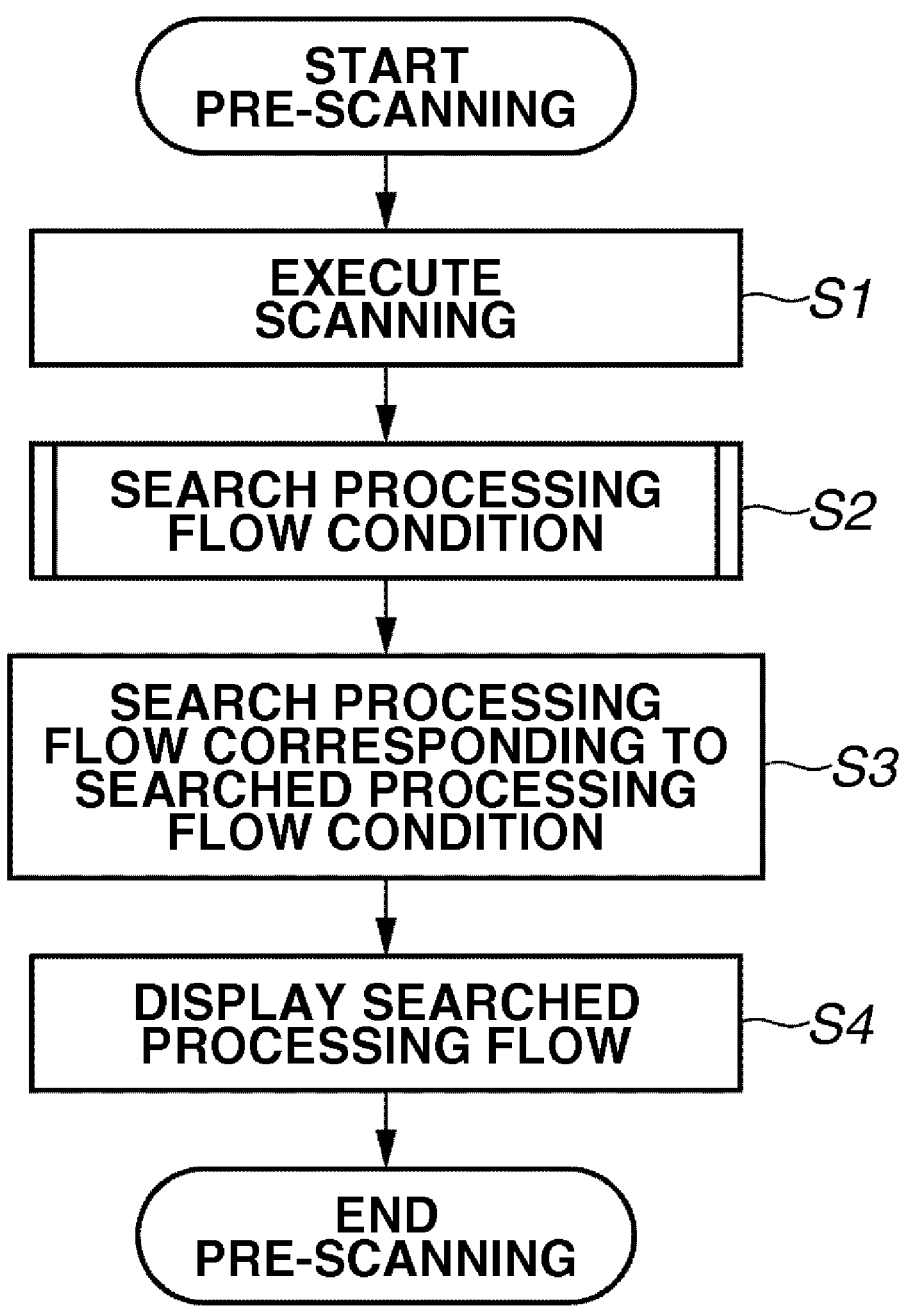

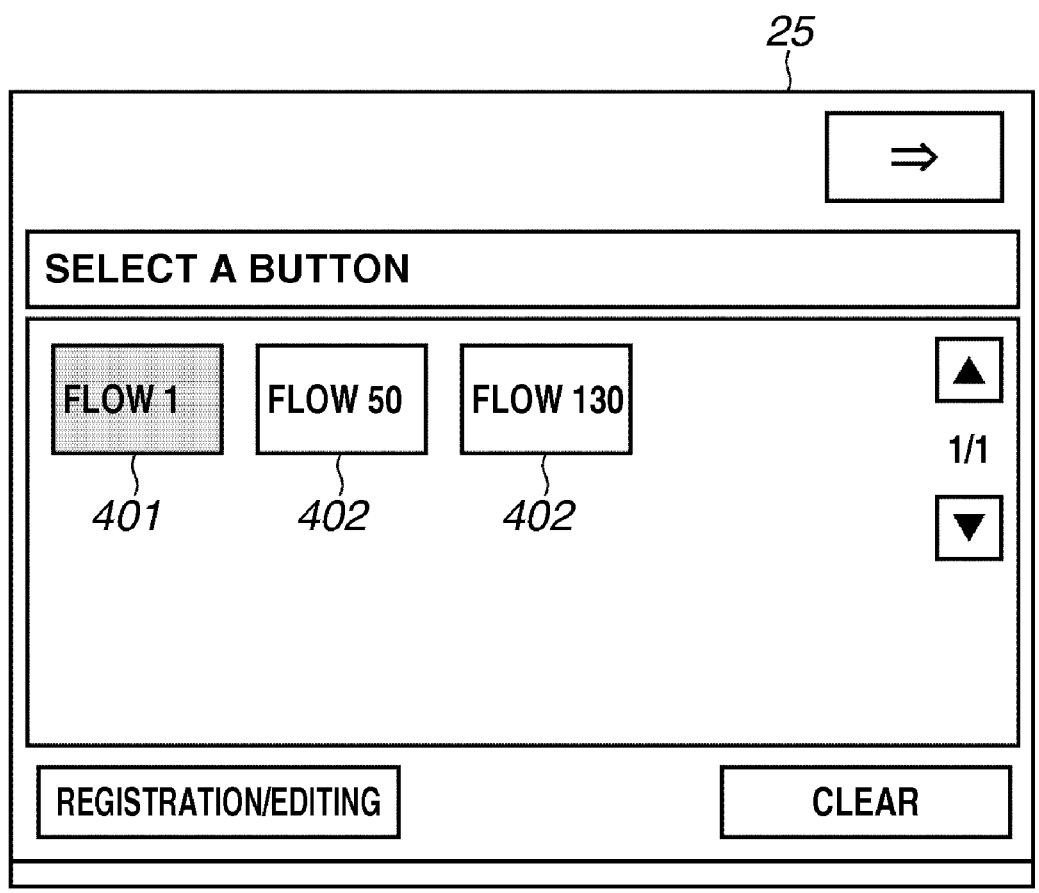

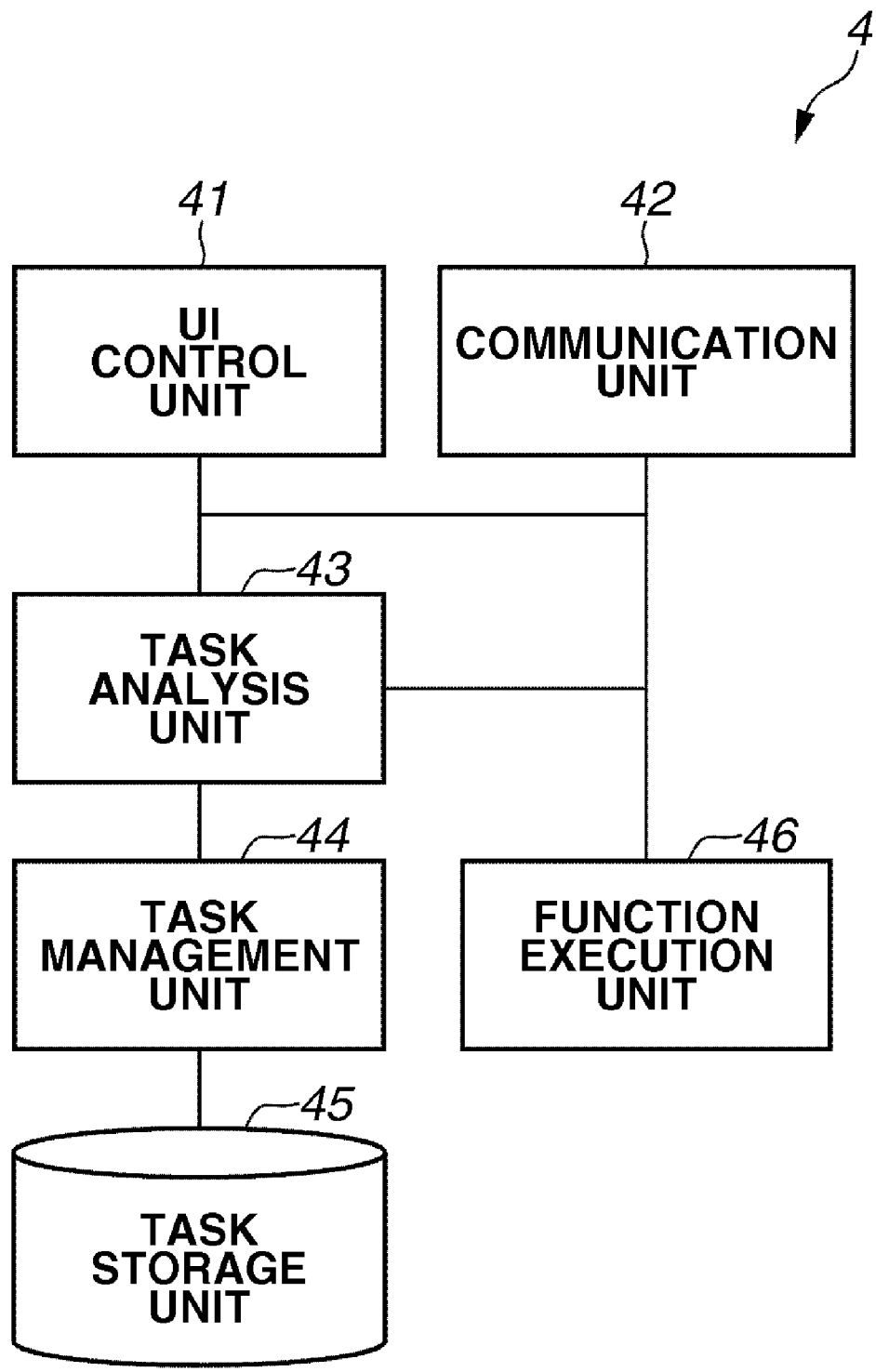

FIG.9A

| TASK CONDITION ID | NUMBER | RESOLUTION | NUMBER OF PAGES | BUSINESS FORM TEMPLATE ID |
|---|---|---|---|---|
| 001 | 3 | 300*300 | 1 | temp_001 |
|  |  |  | 2 | temp_002 |
|  |  |  | 3 | NULL |
| 002 | 2 | 200*200 | 1 | temp_001 |
|  |  |  | 2 | temp_003 |
| ⋮ | ⋮ | ⋮ | ⋮ | ⋮ |

FIG.9B

| PROCESSING FLOW NAME | WORK FLOW ID | TASK LIST |
|---|---|---|
| PROCESSING FLOW A | flow_001 | task_001, task_003, task_002 |
| PROCESSING FLOW B | flow_002 | task_002, task_005 |
| PROCESSING FLOW C | flow_003 | task_005, task_002 |
| PROCESSING FLOW D | flow_004 | task_006, task_001, task_010 |
| ⋮ | ⋮ | ⋮ |

FIG.9C

| TASK NAME | TASK ID | TASK EXECUTION OBJECT | PROCESSING CONTENT | TASK CONDITION ID |
|---|---|---|---|---|
| TASK 1 | task_001 | MFP4 | SCAN TRANSMISSION |  |
| TASK 2 | task_002 | PC8 | SIGNATURE |  |
| TASK 3 | task_003 | PC7 | IMAGE COMPOSITION | 0001 |
| TASK 4 | task_004 | MFP4 | COPY | 0003 |
| ⋮ | ⋮ | ⋮ | ⋮ | ⋮ |

REGISTERING A PLURALITY OF TASKS WITH RESPECT TO A DOCUMENT FOR PROCESSING

BACKGROUND OF THE INVENTION

1. Field of the Invention

The present invention relates to an information processing apparatus, a control method of the information processing apparatus and a computer program thereof.

2. Description of the Related Art

Such an application is proposed that a plurality of tasks with respect to a document held by an image processing apparatus such as a multi function peripheral (MFP) are combined and are registered as a flow of a series of processing, so that the user can read out the series of processing to execute the application. With the above described application, a combination of processing to be used frequently can be executed without troublesome operations. The flow of the series of processing in which the plurality of tasks are combined is defined as a processing flow. In other words, the processing flow is a series of processing including a plurality of processing (tasks). The task is executable with respect to an image data and is the processing which can be executed according to the respective functions of the image processing apparatus having multiple functions. For example, examples of the task of the image processing apparatus include scanning of a document, printing of image data, transmission (of an e-mail, a facsimile, a file or the like) and storage in a disk (i.e., storage in a hard disk installed in the image processing apparatus or an exterior apparatus). However, the task of the image processing apparatus is not limited to the above described processing. Examples of the image data include text data and image data. The processing flow cooperates with a plurality of applications, which can provide various tasks, in addition to the image processing apparatus providing tasks. Examples of the applications include an application which runs on the image processing apparatus and an application which runs on an information processing apparatus such as a computer.

Recently, such a technique has been discussed that preliminarily defines a condition necessary for executing a task or a processing flow, and checks whether the condition is satisfied. For example, as a condition for executing a task such as scanning of a document, the document to be scanned should have a specified business form or a number of the documents to be scanned should be the predetermined number. The condition for executing a task is tied to the task or a processing flow and the condition for executing the task and is checked after the task is executed. Accordingly, in a case where the execution condition is not satisfied, the processing flow is determined to be an error or an alarm can be raised to notify that the execution condition is not satisfied.

On the other hand, the image processing apparatus which displays a button for executing the processing flow is also discussed. This image processing apparatus starts execution of the processing flow corresponding to this button in response to a click of the button by a user. Japanese Patent Laid-open No. 2005-262754 discusses a document printing apparatus which records, together with a processing target document, instruction information describing processing to be executed with respect to the processing target document, onto a print medium. This document printing apparatus prints on the processing target document a bar code indicating, for example, the instruction information describing a series of service processing and reads out the processing target document to automatically execute the series of service processing. Further, in an image processing apparatus discussed in Japanese Patent Laid-open No. 2006-001242, keywords are set to an intended target and an intended object set for the intended target, respectively. This image processing apparatus selects a predetermined keyword from the set keywords and displays either one of the intended target or the intended object which corresponds to the selected keyword.

SUMMARY OF THE INVENTION

According to the present invention, when the user merely scans a document, a user can be provided with information indicating a predetermined processing flow executable after the scanning.

According to a first aspect of the present invention, an information processing apparatus which executes a series of processing including a plurality of processes includes a first storage unit configured to store attribute information of image data necessary for each of the series of processing as an execution condition of the series of processing, a second storage unit configured to store corresponding information between the execution condition of the series of processing and the series of processing, an image data acquisition unit configured to acquire image data, a first search unit configured to search an execution condition of the series of processing in the first storage unit based on the acquired image data and acquire the execution condition of the series of processing which corresponds to the attribute information of the image data, a second search unit configured to search the corresponding information in the second storage unit based on the execution condition of the series of processing acquired by the first search unit and acquire the series of processing which corresponds to the execution condition of the series of processing and a display unit configured to display information indicative of the series of processing acquired by the second search unit.

According to a second aspect of the present invention, a management apparatus which manages a series of processing including tasks which composes processing executed by each of a plurality of information processing apparatus, includes a first storage unit configured to store attribute information of image data necessary for executing each of the tasks as an execution condition of the task, a second storage unit configured to store corresponding information between the execution condition of the task and the task, a third storage unit configured to store corresponding information between the series of processing and the task included in the series of processing, an image data acquisition unit configured to acquire the image data from the information processing apparatus, a first search unit configured to search the execution condition of the task in the first storage unit based on the acquired image data and acquire the execution condition of the task corresponding to attribute information of the image data, a second search unit configured to search the corresponding information in the second storage unit based on the execution condition of the task acquired by the first search unit and acquire the task corresponding to the execution condition of the task, a third search unit configured to search the corresponding information in the third storage unit based on the task acquired by the second search unit and acquire the series of processing corresponding to the task and, a transmission unit configured to transmit the task executed by the information processing apparatus serving as an acquisition source of the image data, among the tasks included in the series of processing acquired by the third search unit, to the information processing apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 4A, 4B and 4C illustrate examples of data configurations of a processing flow condition management file, a processing flow management file and a business form template management file, respectively.

FIGS. 5A and 5B, respectively, illustrates operational processing of the MFP.

FIGS. 6A and 6B illustrate examples of processing for searching a processing flow condition and displaying of start buttons for processing flow execution, respectively.

FIGS. 8A and 8B, respectively, illustrates an example of a functional block diagram of a processing flow management server.

FIGS. 9A, 9B and 9C illustrate examples of data configurations of a task condition management file, a processing flow management file and a task management file, respectively.

DESCRIPTION OF THE EMBODIMENTS

Various exemplary embodiments, features, and aspects of the invention will be described in detail below with reference to the drawings.

In the conventional image processing apparatus which displays a button for executing a processing flow, there is a problem that, the more the number of processing flow, the harder a user finds out a button indicating the processing flow the user desires to execute. Further, since a lot of buttons are displayed, the user may erroneously execute a processing flow different from the processing flow the user desires. The conventional document printing apparatus is not applicable when a service processing is not uniquely determined with respect to a processing target document. Further, this document printing apparatus does not determine whether or not the scanned image data satisfies a condition of image data necessary for executing the service processing.

In the conventional image processing apparatus, the user is required to memorize the keyword which gives a heavy load to the user. In a case where the user have forgotten the keyword or the user does not know the keyword, the user cannot refine the intended target or the intended object which corresponds to the selected keyword. An apparatus has not been proposed that manages a processing flow including each task executed by a plurality of image processing apparatus, identifies an executable processing flow based on attribute information of the acquired image data and transmits the tasks included in this processing flow to the image processing apparatus which executes the tasks.

The present invention is directed to an information processing apparatus which provides information indicating executable series of processing to the user from among the series of processing including a plurality of processing based on the attribute information of the acquired image data.

Figure 1:
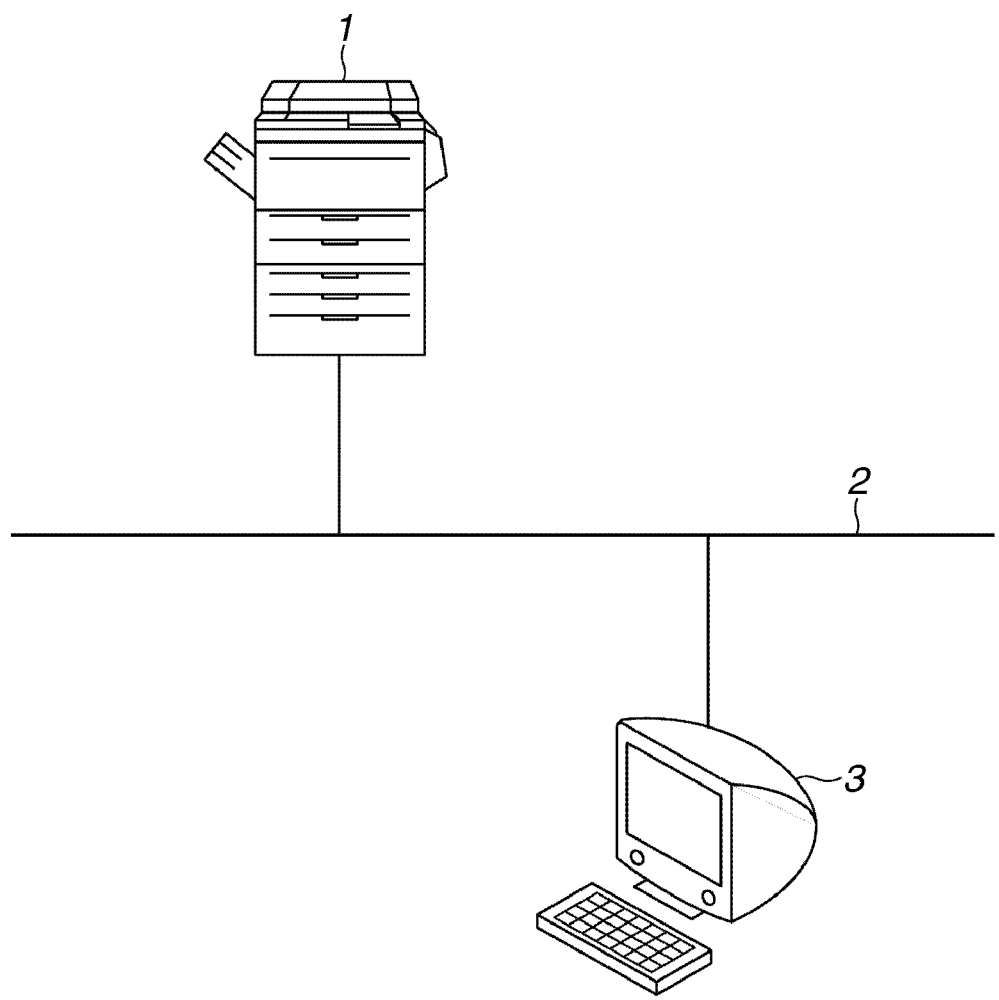
FIG. 1 illustrates an example of a system configuration of the first exemplary embodiment of the present invention.

FIG. 1 illustrates an example of a system configuration of a first exemplary embodiment of the present invention. The present invention is applicable to both of an independent information processing apparatus and a system composed of a plurality of information processing apparatus as far as the function of the present invention can be executed by them. A system illustrated in FIG. 1 includes a multi function peripheral (MFP) 1 and a personal computer (PC) 3. The MFP 1 and the PC 3 are connected to each other through a local area network (LAN) 2. In this example, the LAN 2 is applicable as a connection unit for establishing a connection between the MFP 1 and the PC 3. However, the connection unit is not limited to the LAN. For example, an arbitrary network such as a wide area network (WAN), a serial transmission network such as a universal serial bus (USB) and a parallel transmission network such as a small computer system interface (SCSI) are also applicable to the present invention.

The MFP 1 is an information processing apparatus which executes a processing flow that is a series of processing including a plurality of processing. In the first exemplary embodiment of the present invention, each of the processing included in the processing flow is a task. The MFP 1 includes, for example, a copying function and a facsimile function as well as a transmission function for reading out a document image and transmitting thus read out image data to an apparatus which is connected through the LAN 2. The MFP 1 can receive and print a page description language (PDL) image instructed from a computer such as a PC 3 connected through the LAN 2. Further, the MFP 1 has a function to store the read out image data and the PDL image in a hard disk drive (HDD) 14 (see FIG. 2A) of the MFP 1. The MFP 1 can print and transmit through a facsimile machine the image data stored in the HDD 14.

A business form recognition application is installed in the PC 3. The PC 3 functions, by using the business form recognition application, as a business form recognition unit which is configured to execute a business form recognition processing with respect to a scanned image data transmitted from the MFP 1 and acquire business form information as to a business form of the scanned image data. In a business form recognition in the present exemplary embodiment, the image data is divided into a plurality of regions and a degree of similarity is calculated from the feature quantity in each of the regions. However, the method of the business form recognition is not limited to the above but any other desirable business form recognition method can be applied to the present invention. As the information processing apparatus of the first exemplary embodiment of the present invention, an information processing apparatus having functions of the MFP 1 and the PC 3 can be applicable in addition to the independent MFP 1.

Figure 2A:
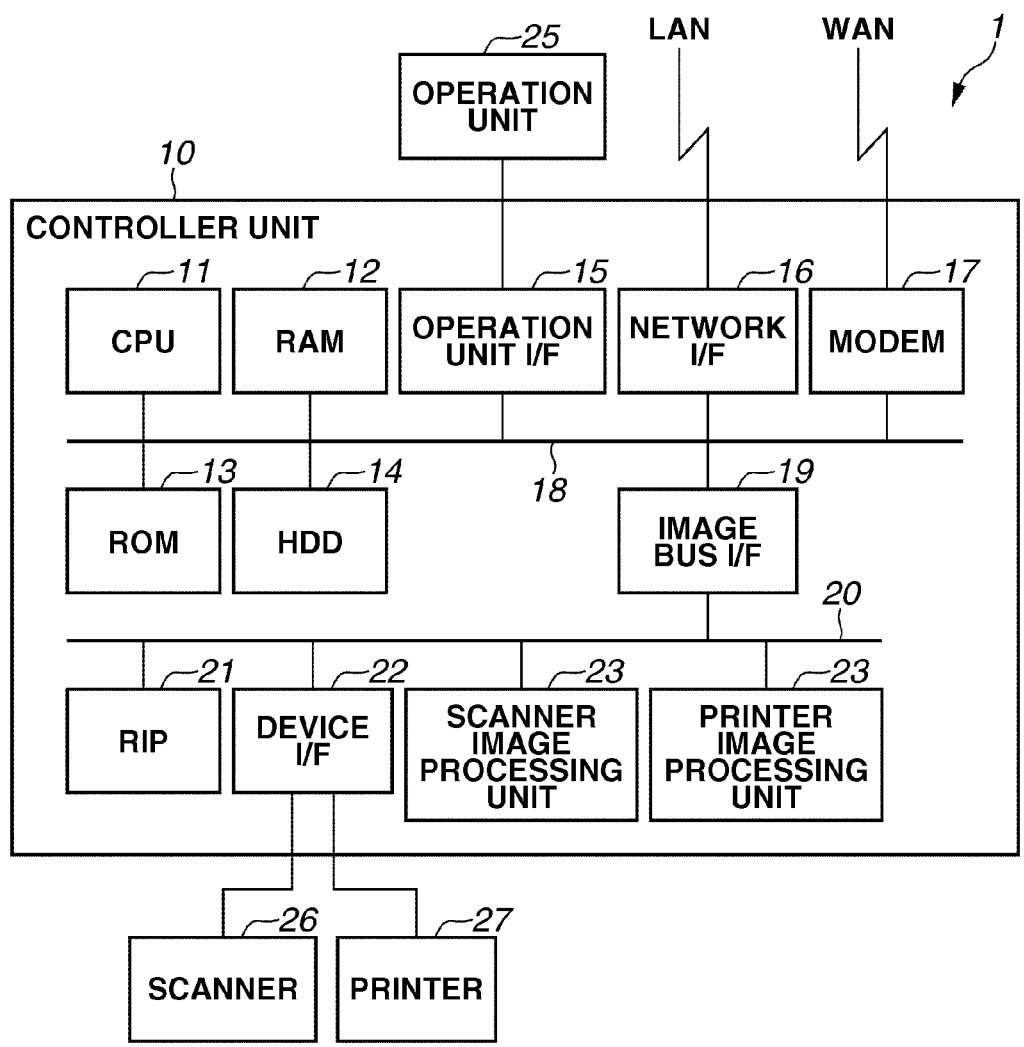
FIGS. 2A and 2B illustrate examples of a hardware configuration and a functional block diagram of a multi function peripheral (MFP), respectively.
Figure 2B:
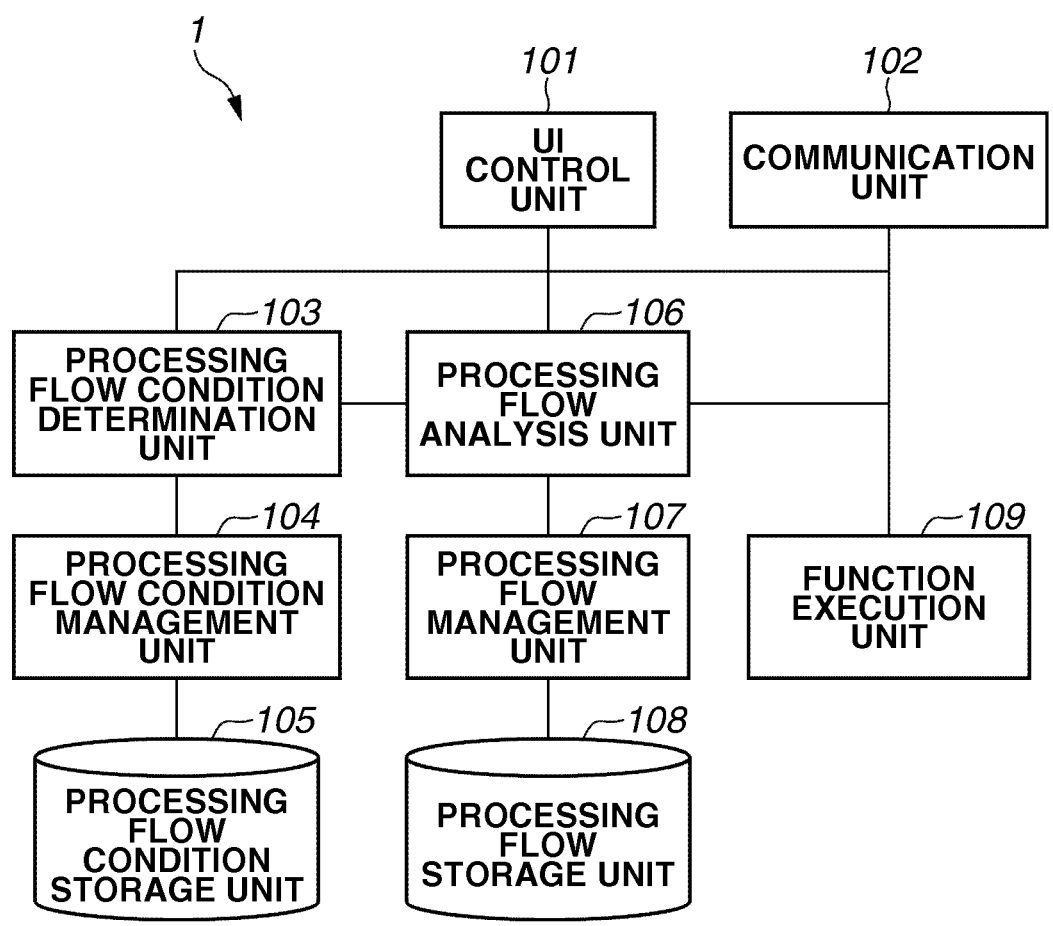

FIG. 2A and 2B illustrate examples of a hardware configuration and a functional block diagram of the MFP illustrated in FIG. 1, respectively. FIG. 2A illustrates the hardware configuration of the MFP 1. The MFP 1 includes a controlling unit 10, an operation unit 25, a scanner 26 and a printer 27. The controlling unit 10 is connected to the scanner 26 as an image input device and the printer 27 as an image output device. The controlling unit 10 also has a function of a control unit for controlling an input/output of image information and device information while the controlling unit 10 is connected to the LAN or WAN. The operation unit 25 inputs operation information input by the user into the controlling unit 10.

The controlling unit 10 includes a central processing unit (CPU) 11, a random access memory (RAM) 12 and a read only memory (ROM) 13. The controlling unit 10 further includes a hard disk drive (HDD) 14, an operation unit Interface (I/F) 15 and a network I/F 16. The controlling unit 10 further includes a modem 17, a system bus 18 and an Image Bus I/F 19. The controlling unit 10 still further includes an image bus 20, a raster image processor (RIP) 21, a device I/F 22, a scanner image processing unit 23 and a printer image processing unit 24.

The CPU 11 controls the system in its entirety. The RAM 12 is a system work memory where the CPU 11 runs. The RAM 12 is also an image memory for temporarily storing image data. The ROM 13 is a boot ROM in which a boot program of the system is stored. The HDD 14 stores image data and a software module. The operation unit I/F 15 outputs information to the operation unit (i.e., a UI) 25 and inputs operation information input by the operation unit 25 to the controlling unit 10. The operation unit I/F 15 outputs, for example, the image data to be displayed on the operation unit 25, to the operation unit 25. The network I/F 16 is connected to the LAN to input/output information. The modem 17 is connected to the WAN to input/output the image information. The above described devices from CPU 11 through the modem 17 are disposed on a system bus 18.

An Image Bus I/F 19 is a bus bridge which connects the system bus 18 with the image bus 20 and converts a data configuration of the image data which is transferred through an image bus 20. The image bus 20 transfers the image data at high velocity. On the image bus 20, the RIP 21, the device I/F 22, the scanner image processing unit 23 and the printer image processing unit 24 are disposed. The RIP 21 rasterizes a PDF code into a bitmap image. The device I/F 22 is configured to connect the scanner 26 and the printer 27 to the controlling unit 10. The scanner image processing unit 23 is configured to correct, process and edit the input image data. The scanner image processing unit 23 has a function to determine whether or not the input image is a color document or a black-and-white document based on a saturation signal of the image and to hold the determination result. The printer image processing unit 24 is configured to correct, process and edit the output image data.

FIG. 2B illustrates an example of a functional block diagram of the MFP 1. FIG. 2B illustrates among the processing units of the MFP 1 a processing unit, which realizes a function as to search processing of the processing flow. A computer program which realizes a function of each of the processing units illustrated in FIG. 2B is stored in the HDD 14 and is read out by the CPU 11 onto the RAM 12 to be executed. The computer program may be stored in the ROM 13. The MFP 1 includes a user interface (UI) control unit 101, a communication unit 102, a processing flow condition determination unit 103, a processing flow condition management unit 104, a processing flow condition storage unit 105 and a processing flow analysis unit 106. The MFP 1 further includes a processing flow management unit 107, a processing flow storage unit 108 and a function execution unit 109. The UI control unit 101 is configured to display a screen by issuing an instruction to the operation unit 25 through the operation I/F 15 (see FIG. 2A) and process the operation input information from the operation unit 25. For example, the UI control unit 101 issues an instruction to the operation unit 25 to cause the operation unit 25 to display the below described operation information input screen with reference to FIG. 5A. Further, for example, the UI control unit 101 is configured to issue an instruction to the operation unit 25 and function as a display unit which displays information indicating the processing flow acquired by the below described processing flow condition determination unit 103. The communication unit 102 is configured to operate the network I/F 16 and the modem 17 to establish a communication.

The processing flow condition determination unit 103 is an image data acquisition unit for acquiring image data (e.g., scanned image data) from the function execution unit 109. The processing flow condition determination unit 103 is a first search unit for determining whether attribute information of the scanned image data matches the processing flow condition indicated by the processing flow condition management file within a first storage unit (i.e., within the processing flow condition storage unit 105). The processing flow condition determination unit 103 acquires the processing flow condition which matches the attribute information. The scanned image data is image data that can be acquired by causing the function execution unit 109 to scan a document. The processing flow condition management file is a file having an execution condition of the processing flow. More specifically, the processing flow condition management file defines the attribute information of the image data necessary for executing the processing flow, as an execution condition of the processing flow. The processing flow condition determination unit 103 has a function as a second search unit which searches the processing flow management file within a second storage unit (i.e., the processing flow storage unit 108) based on the acquired processing flow condition and acquires the processing flow corresponding to the processing flow condition. The processing flow management file is configured to have corresponding information between the execution condition of the processing flow and the processing flow.

According to the first exemplary embodiment of the present invention, the attribute information of the scanned image data includes business form information about the business form of the scanned image data. This business form information is, for example, identification information of a business form template (i.e., a business form template ID) corresponding to the scanned image data. The processing flow condition determination unit 103 transmits the scanned image data to the PC 3 through the communication unit 102 and submits a request for business form recognition of the image data. The processing flow condition determination unit 103 receives a business form recognition result executed by the PC 3 through the communication unit 102. This business form recognition result includes the business form information about the business form of the scanned image data. The processing flow condition determination unit 103 acquires from among the processing flow conditions within the processing flow condition storage unit 105 an execution condition of the processing flow corresponding to the business form information that is included in the business form recognition result received from the PC 3. The processing flow condition determination unit 103 may be configured to execute the business form recognition processing of the scanned image data.

According to the first exemplary embodiment of the present invention, the attribute information of the scanned image data defined by the processing flow condition management file may contain a resolution of the scanned image data and business form information for every pages corresponding to the scanned image data. The processing flow condition determination unit 103 acquires the execution condition of the processing flow that matches the business form information contained in the business form recognition result based on the business form information contained in the business form recognition result received from the PC 3, the resolution contained in the attribute information of the scanned image data and the business form information for every pages. The processing flow condition determination unit 103 may determine whether there is a complete match, a partial match or a no match between the business form information contained in the business form recognition result received from the PC 3 and the execution condition of the processing flow defined by the processing flow condition management file. Then, the UI control unit 101 may display the information indicating the processing flow condition in the form of the display form corresponding to the determination result as to the processing flow by issuing such instruction to the operation unit 25.

The processing flow condition management unit 104 manages the processing flow condition management file. The processing flow condition storage unit 105 stores the processing flow condition management file. In other words, the processing flow condition storage unit 105 is a storage unit (i.e., a first storage unit) for storing the attribute information of the image data necessary for each of the processing flows as the execution condition of the processing flow. The processing flow analysis unit 106 analyzes a processing flow definition file stored in the processing flow storage unit 108. The processing flow definition file is configured to have definition information of the processing flow. The processing flow analysis unit 106 disassembles the processing flow to a task per functional unit (e.g., a scanning job setting, a print job setting and a transmission job setting). The processing flow management unit 107 manages the processing flow management file. The processing flow storage unit 108 is a storage unit (i.e., a second storage unit) for storing the processing flow management file. The processing flow storage unit 108 is configured to store the processing flow definition file indicated by the processing flow management file.

The function execution unit 109 generates a task based on setting information of each of various tasks and executes the task. Each of the tasks is generated according to a request from the UI control unit 101, the communication unit 102 and the processing flow analysis unit 106. For example, in a case where the UI control unit 101 inputs an instruction to copy or scan from the user, a task setting of the copying processing or the scanning processing is passed to the function execution unit 109 from the UI control unit 101. The function execution unit 109 is configured to execute the tasks in order of the passing. For example, the function execution unit 109 executes scanning of a document and passes thus acquired scanned image data to the processing flow condition determination unit 103. Also, in a case where the task setting is passed from the other MFPs or PCs through the communication unit 102, the function execution unit 109 executes the tasks in order of this passing.

Figure 3A:
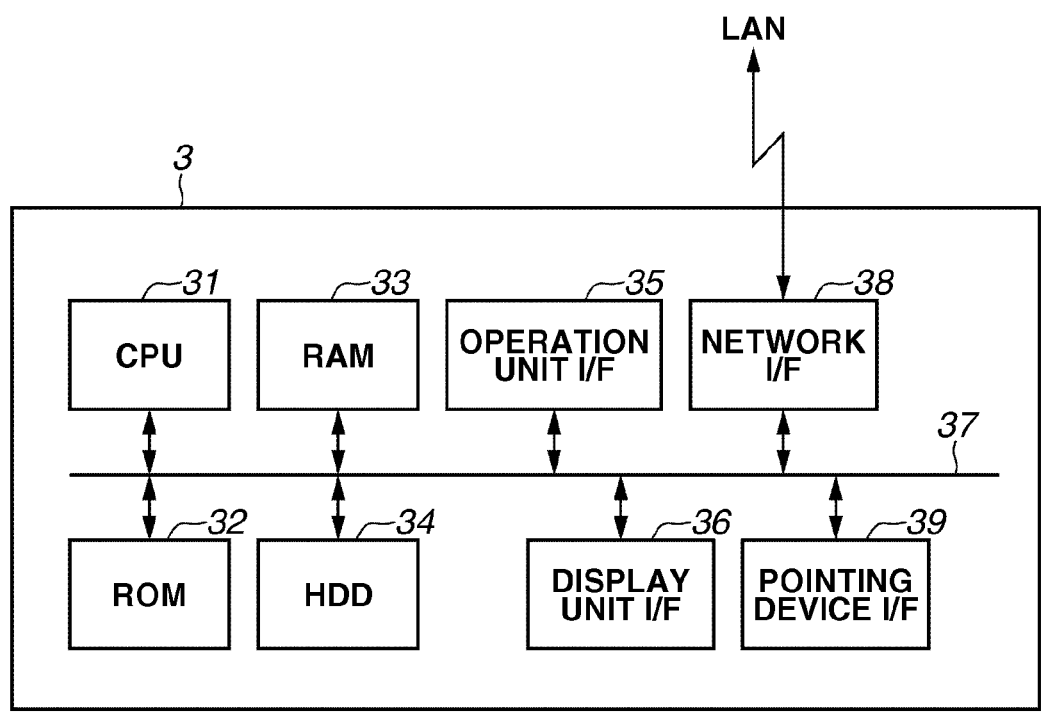
FIGS. 3A and 3B illustrate examples of a hardware configuration and a functional block diagram of a personal computer (PC), respectively.
Figure 3B:
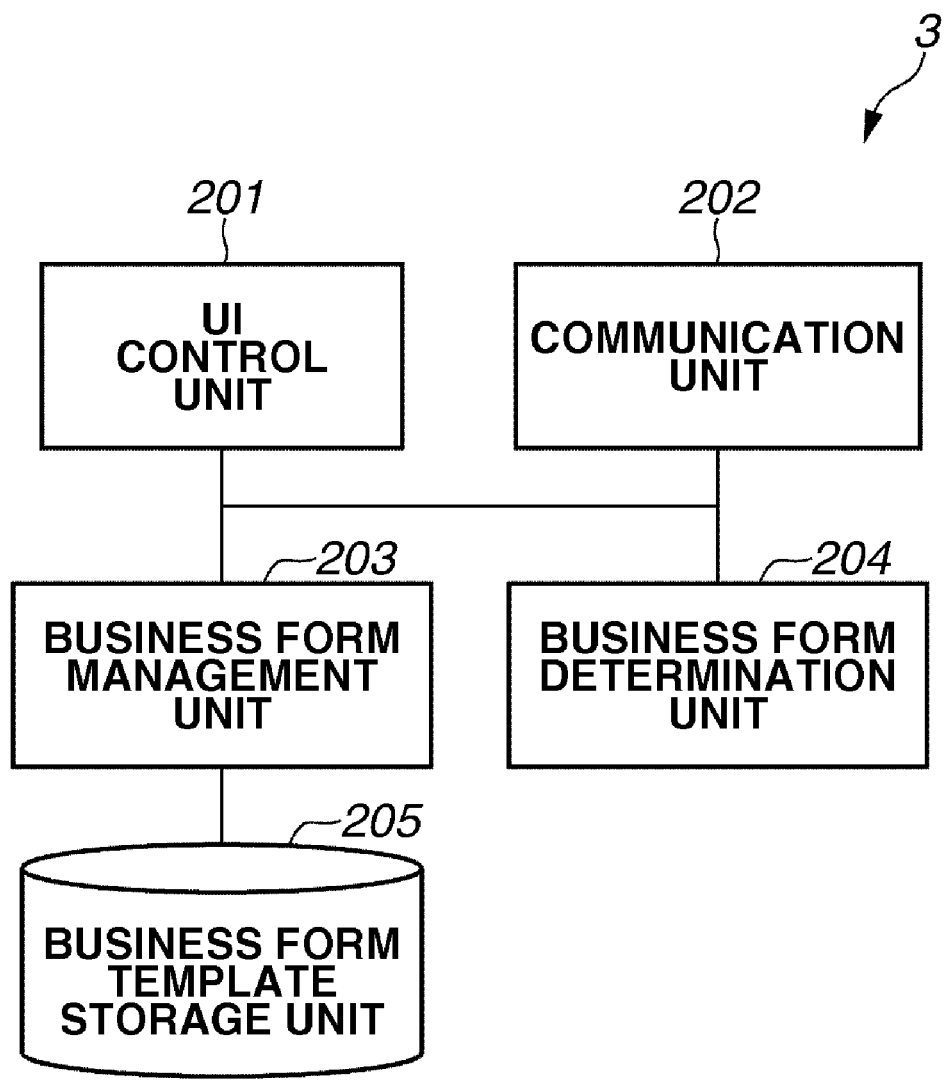

FIGS. 3A and 3B, respectively, illustrates an example of a hardware configuration and an example of a functional block diagram of the PC illustrated in FIG. 1. FIG. 3A illustrates the example of the hardware configuration of the PC 3. The PC 3 includes a CPU 31, a ROM 32, a RAM 33, a HDD 34, an operation unit I/F 35, a display unit I/F 36, a system bus 37, a network I/F 38 and a pointing device I/F 39. The CPU 31, the ROM 32, the RAM 33 and the HDD 34 are disposed on the system bus 37. The operation unit I/F 35 to be connected with a keyboard or the like, the display unit I/F 36 to be connected to a cathode-ray tube (CRT) or the like, a network I/F 38 and the pointing device I/F 39 to be connected to a mouse or the like are also disposed on the system bus 37.

The CPU 31 reads out the control program or the application program for controlling the PC 3 in its entirety onto the RAM 33 from the ROM 32 or the HDD 34 to execute thus read control program or the application program on the RAM 33. The CPU 31 displays various types of information through the display I/F 36 as well as accepts instructions or the like of the user through the operation unit I/F 35 or the pointing device I/F 39. The CPU 31 is configured to communicate with the other apparatus on the LAN through the network I/F 38. The ROM 32 and the HDD 34 preliminary store the control program or the application program.

FIG. 3B illustrates the example of the functional block diagram of the PC 3. The program which realizes the function of the PC 3 is stored in the HDD 34 and read out onto the RAM 33 by the CPU 31 to be executed on the RAM 33. The PC 3 includes a UI control unit 201, a communication unit 202, a business form management unit 203, a business form determination unit 204 and a business form template storage unit 205.

The UI control unit 201 is configured to display information through the display unit I/F 36. The UI control unit 201 receives input by the user from the keyboard or the mouse through the operation unit I/F 35 or the pointing device I/F 39 to process the input information. The communication unit 202 is configured to establish a communication with an external apparatus through the network I/F 38. The business form management unit 203 is configured to manage the business form template management file. The business form template management file is described later. The business form management unit 503 is configured to store the business form template management file in the business form template storage unit 205 and read out the business form template management file from the business form template storage unit 205. The business form determination unit 204 determines, among the business form templates indicated by the business form template management file stored in the business form template storage unit 205, a business form template to which the image data received from the UI control unit 201 or the communication unit 202 corresponds. The business form template storage unit 205 stores the business form template management file. The method for controlling the information processing apparatus and the computer program thereof of the first exemplary embodiment of the present invention is realized by a function of each processing unit of the MFP 1 illustrated in FIG. 2B and a function of each processing unit of the PC 3 illustrated in FIG. 3B.

FIGS. 4A, 4B and 4C illustrate examples of a data configuration of the processing flow condition management file, the processing flow management file and the business form template management file, respectively. In FIGS. 4A, 4B and 4C, the processing flow condition management file, the processing flow management file and the business form template management file are illustrated in the form of a table. However, all the files may also be illustrated in the form of a comma separated value (CSV) format text file or an extensible markup language (XML) text file. FIG. 4A illustrates the example of the data configuration of the processing flow condition management file. The processing flow condition management file includes data items such as a flow condition ID, the number, a resolution, the number of pages and a business form template ID.

The flow condition ID is identification information for uniquely identifying the execution condition of the processing flow. The number represents the condition of the number of pieces of the image data necessary for executing the processing flow. For example, execution of the processing flow indicated by the flow condition ID of 0001 requires three pieces of scanned image data. The resolution represents a condition of the resolution of the image data. For example, in executing the processing flow indicated by the flow condition ID of 0001, the scanned image data should have the resolution of 300×300 dpi. The number of pages represents the number of pages corresponding to the scanned image data. The business form template ID is identification information for uniquely identifying the business form template corresponding to each of the pages of the scanned image data. In this example, when the processing flow indicated by the flow condition ID of 0001 is executed, the first page of the scanned image data is to be a business form template of temp_001 and the second page of the scanned image data is to be a business form template of temp_002.

FIG. 4B illustrates the example of the data configuration of the processing flow management file. The processing flow management file includes data items such as a flow name, a flow ID, a definition file and a flow condition ID. The flow name represents a name of the processing flow. The flow ID represents identification information for uniquely identifying the processing flow. The definition file represents the processing flow definition file. The processing flow definition file is stored in a predetermined storage region of the processing flow storage unit 108. The flow condition ID is identical to the flow condition ID contained in the processing flow condition management file of FIG. 4A.

FIG. 4C illustrates the example of the data configuration of the business form template management file. The business form template management file includes data items such as a business form template ID, business form data, a field ID and a position of a region. The business form template ID represents identification information for uniquely identifying the business form template. The business form data is image data of business form template. The field ID is identification information for identifying the region when the business form data is divided into the plurality of regions. The position of the region is illustrated by the coordinates of the divided region referring to the origin on the image. For example, the position of the region corresponding to the field ID of f_001 is represented by (sx1, sy1), (ex1, ey1). The (sx1, sy1) illustrates an upper left coordinate of the divided region. The (ex1, ey1) illustrates a lower right coordinate of the divided region. The sx1 and the ex1 indicate a position on x coordinate. The sy1 and the ey1 indicate a position on y coordinate.

Figure 5A:
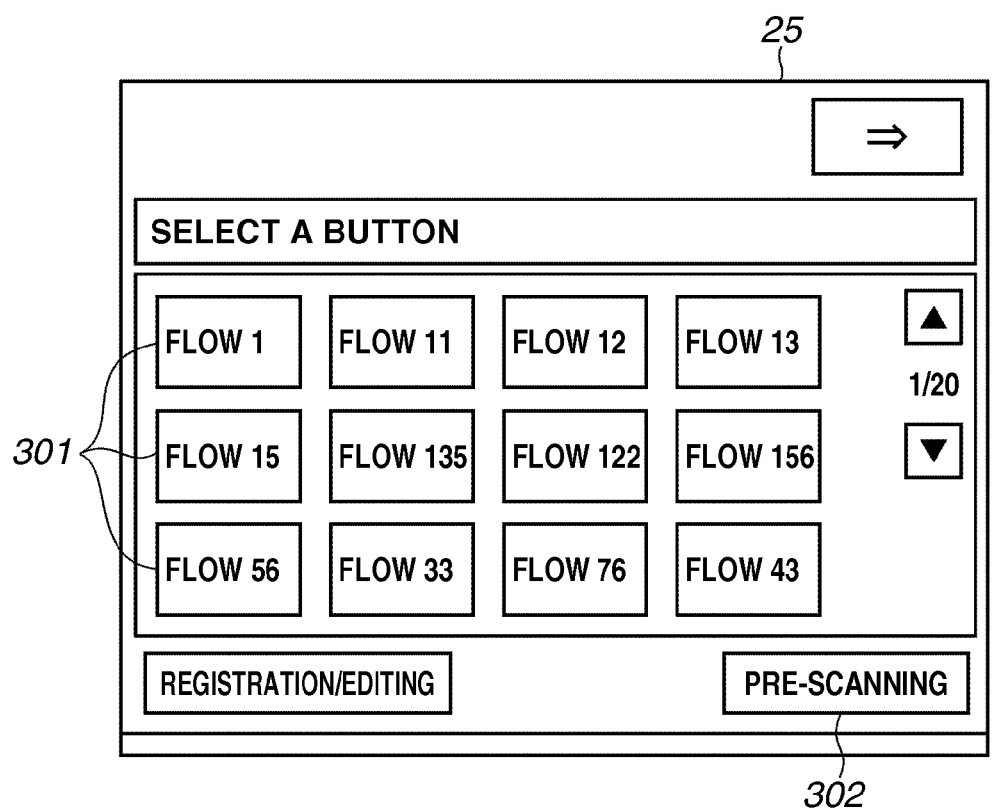

FIGS. 5A and 5B illustrate operation processing of the MFP. FIG. 5A illustrates an example of an operation information input screen. Each of start buttons 301 for the processing flow execution in the operation information input screen is configured to start execution of the corresponding processing flow. When one of the processing flow execution start buttons 301 is clicked, the processing flow corresponding to the start button 301 for processing flow execution is executed. More specifically, when the user clicks the start button 301 for processing flow execution, the UI control unit 101 passes the ID of the processing flow corresponding to the clicked start button 301 for processing flow execution to the processing flow analysis unit 106 in order to give an instruction for execution of this processing flow. The processing flow analysis unit 106 acquires the processing flow definition file corresponding to the processing flow identified by the processing flow ID within the processing flow storage unit 108 through the processing flow management unit 107. The processing flow analysis unit 106 divides the acquired processing flow into tasks and passes thus divided tasks to the function execution unit 109. The function execution unit 109 executes the received tasks in order of the passing. Accordingly, the processing flow is executed. A pre-scanning execution button 302 of the operation information input screen is configured to start pre-scanning. When the pre-scanning execution button 302 is clicked, the pre-scanning is executed. In the present exemplary embodiment, the pre-scanning is the processing in which the document is scanned with the predetermined setting to acquire image data of the document and a processing flow is searched based on the acquired image data.

FIG. 5B is a flow chart illustrating operation processing of the MFP of the present exemplary embodiment. A program which realizes each processing illustrated in the flow chart of FIG. 5B is stored in the HDD 14. The program is read out onto the RAM 12 by the CPU 11 to be executed on the RAM 12. When the user clicks the pre-scanning execution button 302 on the operation information input screen, the UI control unit 101 issues an instruction to execute the pre-scanning to the function execution unit 109. In step S1, the function execution unit 109 executes scanning by default. The function execution unit 109 passes the image data acquired by the scanning processing to the processing flow condition determination unit 103. In step S2, the processing flow condition determination unit 103 performs search processing to search the processing flow condition. More specifically, the processing flow condition determination unit 103 performs search to find a processing flow condition which the received image data matches, among the processing flow conditions indicated by the processing flow condition management file within the processing flow condition storage unit. The result of searching the processing flow condition includes a coincidence flag indicating whether the business form recognition result completely or partially matches the flow condition ID indicating the searched processing flow condition and the processing flow condition. The complete matching and the partial matching are described later with reference to FIG. 6.

Subsequently, the processing flow condition determination unit 103 acquires the processing flow management file in the processing flow storage unit 108 through the processing flow management unit 107. Then, in step S3, the processing flow condition determination unit 103 refers to thus acquired processing flow management file to thereby search the processing flow corresponding to the processing flow condition searched in the search processing in step S2. The processing flow condition determination unit 103 holds the flow ID indicative of the searched processing flow and the coincidence flag as the processing flow search result. The processing flow condition determination unit 103 passes the processing flow search result to the UI control unit 101. In step S4, the UI control unit 101 issues an instruction to the operation unit 25 so as to cause the operation unit 25 to display image information indicating the processing flow searched in the above described step S3 based on the processing flow search result received from the processing flow condition determination unit 103. For example, the UI control unit 101 displays on a screen a processing flow execution start button which serves to start execution of the processing flow.

Figure 6A:
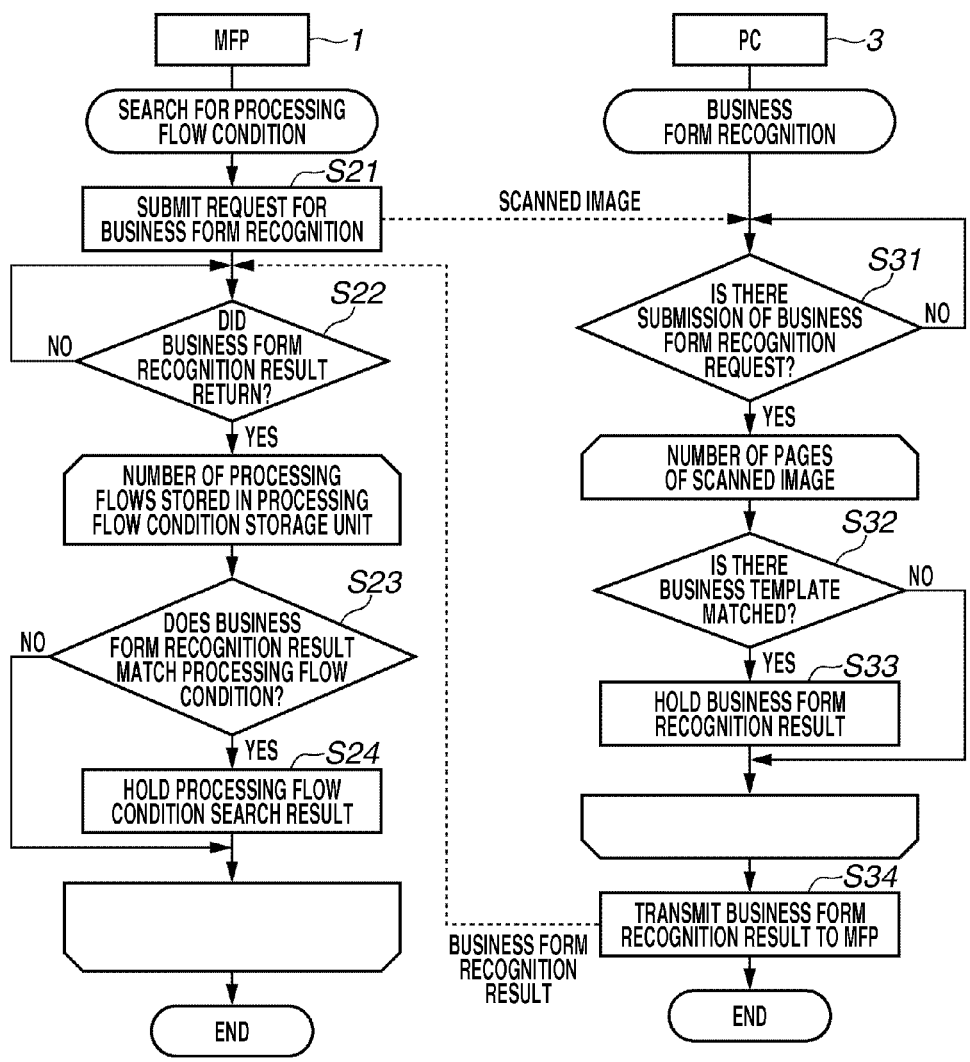

FIGS. 6A and 6B, respectively, illustrates a search processing of the processing flow condition and a display example of a processing flow execution start button. FIG. 6A illustrates the search processing of the processing flow condition. Processing of steps S21 through S24 illustrated in FIG. 6A corresponds to processing in step S2 of FIG. 5B. In step S21, the processing flow condition determination unit 103 of the MFP 1 transmits the image data obtained by scanning in step S1 (i.e., the scanned image data) to the PC 3 through the communication unit 102 and submits a request for the business form recognition of the image data. In step S31, the communication unit 202 of the PC 3 monitors to detect whether the request of the business was submitted form recognition from the MFP 1. In a case where there is no request (NO in step S31), the communication unit 202 keeps monitoring. In a case where there was the request (YES in step S31), the communication unit 202 passes the received image data to the business form determination unit 204.

Subsequently, the business form determination unit 204 repeats the processing of steps S32 and S33 for the number of pages of the scan image data that was transmitted from the MFP 1. More specifically, in step S32, the business form determination unit 204 determines whether or not there is a business form template which matches the scan image data with reference to the business form template management file in the business form template storage unit 205. In order to make this determination, the business form determination unit 204 performs the business form recognition of the scan image data. In other words, the business form determination unit 204 divides the scan image data into regions each having a field ID and positional information of the region and calculates the feature quantity as to each of the regions by using a publicly known feature quantity calculation method. Then, the business form determination unit 204 calculates a degree of similarity with the business form template indicated by the business form template management file based on the calculated feature quantity. The business form determination unit 204 calculates the degree of similarity by using a publicly known similarity calculation method. The business form determination unit 204 determines that the business form template having the highest degree of similarity among the business form templates having a degree of similarity beyond a predetermined threshold is the business form template which matches the scanned image data. In a case where the degree of similarity is not beyond the threshold, the business form determination unit 204 determines that the business form template does not match the scanned image data. In a case where there is the business form template matched (YES in step S32), the processing proceeds to step S33. In a case where there is no business form template matched (NO in step S32), the processing proceeds to step S34. The above described business form recognition performed by using the feature quantity and the degree of similarity is a mere example and thus any other business form recognition method can also be used in the present invention.

In step S33, the business form determination unit 204 holds the business form template ID which is the business form template ID matched in step S32, the number of pieces of the scanned image data, the resolution and the information of the number of pages as the business form recognition result. In other words, the business form recognition result includes data items similar to the data items of the processing flow condition management file illustrated in FIG. 4A except for not having the flow condition ID. In step S34, the business form determination unit 204 transmits the business form recognition result to the MFP 1 through the communication unit 202. In step S22, the communication unit 102 of the MFP monitors whether or not the business form recognition result is returned from the PC 3. In a case where the business form recognition result is returned from the PC 3 (YES in step S22), the communication unit 102 passes thus received business form recognition result to the processing flow condition determination unit 103. Ina case where the business form recognition result does not return (NO in step S22), the communication unit 102 keeps monitoring.

Then, the processing flow condition determination unit 103 repeats the processing of the below described steps S23 and S24 for the number of processing flow conditions stored in the processing flow condition storage unit 105. More specifically, the processing flow condition management unit 104 extracts a processing flow condition management file from the processing flow condition storage unit 105 and passes the processing flow condition management file to the processing flow condition determination unit 103. In step S23, the processing flow condition determination unit 103 determines whether or not the processing flow condition indicated by thus received processing flow condition management file matches the business form recognition result received from the PC 3. In step S23, the processing flow condition determination unit 103 also determines whether or not the business form recognition result matches conditions of the number and the resolution indicated by the processing flow condition management file. In a case where the processing flow condition determination unit 103 determines that the processing flow condition matches the business form recognition result (YES in step S23), the processing proceeds to step S24. In a case where the processing flow condition determination unit 103 determines that the processing flow condition does not match the business form recognition result (NO in step S23), the processing is ended. In the present exemplary embodiment, a state of matching between the processing flow condition and the business form recognition result includes the states of the complete matching and the partial matching. In the complete matching, the number, the resolution, the number of pages and the business form template ID indicated by the processing flow condition are identical to the number, the resolution, the number of pages and the business form template ID, respectively, included in the business form recognition result.

In the partial matching, if the same document or the other additional document is re-scanned, the processing flow condition may be satisfied. For example, it is seen from the business form recognition result of the two pieces of the scanned image data that the business form template IDs of the first page and the second page, respectively, is temp__001 and temp__002. When referring to the flow condition that the flow condition ID is 0001 in the processing flow condition management file of FIG. 4A, the business form recognition result matches the business form template IDs corresponding to the first and the second pages among the business form template IDs of the three pages of the flow conditions. Therefore, the processing flow condition determination unit 103 determines that the business form recognition result partially matches the flow condition that the flow condition ID is 0001. The reason why the partial matching is included in the search result is, when the processing flow is executed after the completion of the search, if one more page is scanned, it becomes three pages and thus the processing flow condition is satisfied. On the other hand, in a case where the business form recognition result indicates four pages, the processing flow condition determination unit 103 determines that this business form recognition result does not match the flow condition that the flow condition ID is 0001. In a case where the business form recognition result differs from the processing flow condition in the condition of the resolution, the re-scanning may results in satisfaction of the condition. Therefore, in this case, the processing flow condition determination unit 103 determines that the business form recognition result partially matches the processing flow condition. Subsequently, in step S24, the processing flow condition determination unit 103 holds the search result of the processing flow condition and the processing is ended. The search result of thus held processing flow condition includes the ID of the processing flow condition (i.e., the flow condition ID) which was determined as being matched with the business form recognition result and a coincidence flag indicating whether the processing flow condition partially matches or completely matches the business form recognition result.

FIG. 6B illustrates an example display of the screen of the processing flow execution start button in step S4 of FIG. 5B. The start button for processing flow execution includes a completely matching button 401 and a partially matching button 402. The completely matching button 401 indicates a processing flow corresponding to the processing flow condition that completely matches the business form search result. The partially matching button 402 indicates a processing flow corresponding to the processing flow condition that partially matches the business form search result. When the completely matching button 401 or the partially matching button 402 is clicked, the processing flow corresponding to each of the buttons is executed. As is illustrated in FIG. 6B, display colors of the completely matching button 401 and the partially matching button 402 are different from each other. Accordingly, when the processing flow corresponding to the button is executed, whether the re-scanning is not necessary (i.e., whether it is completely matched) or necessary (i.e., whether it is partially matched) can be notified to the user. The display forms of the completely matching button 401 and the partially matching button 402 can be in any forms as far as they are different from each other. For example, a size of the completely matching button 401 may be made different from a size of the partially matching button 402. Alternatively, the button may be made with a sign attached which describes the operation of each of the buttons. According to the above described first exemplary embodiment of the present invention, by only scanning the document, the button is displayed which starts execution of the processing flow the user desires while the user is not aware of the search keyword or the like. Also, it becomes easier for the user to determine whether or not the re-scanning is necessary when the processing flow is executed.

Figure 7:
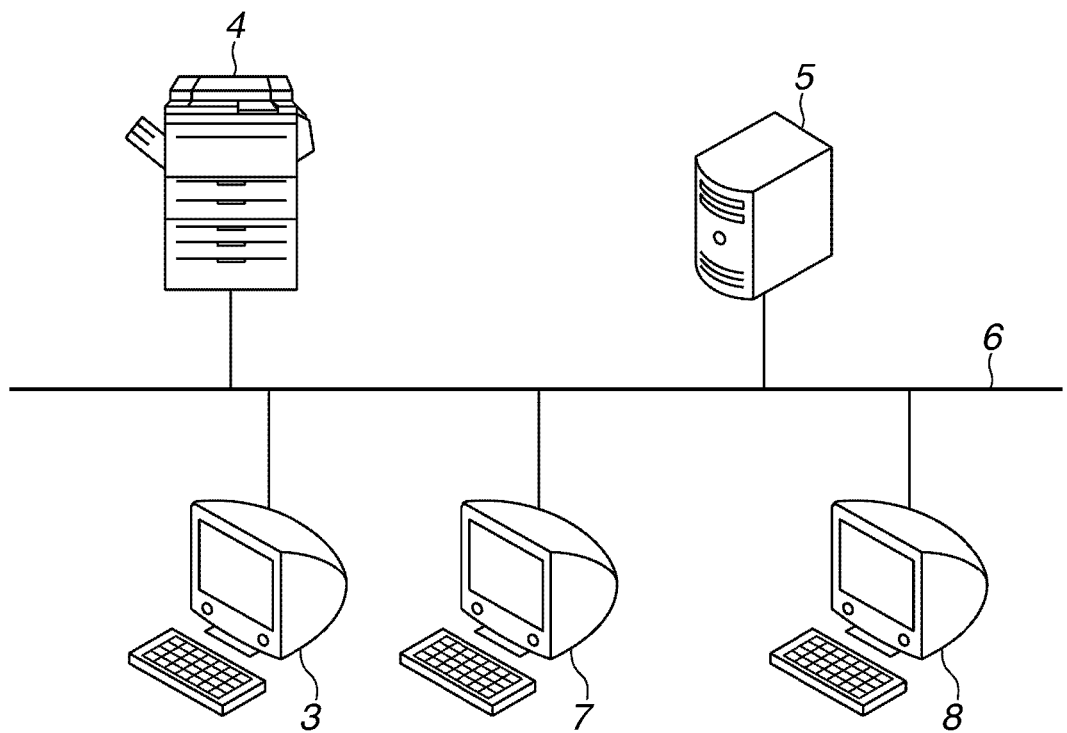
FIG. 7 illustrates an example of a system configuration of a second exemplary embodiment of the present invention.

FIG. 7 illustrates an example of a system configuration according to a second exemplary embodiment of the present invention. In the above described first exemplary embodiment, the unit which analyzes and executes the processing flow is installed into the MFP 1. In the first exemplary embodiment, the described tasks are each of the processing included in the processing flow executed by the MFP 1. In the below described second exemplary embodiment of the present invention, the processing flow is considered to be the one closer to a work flow and the processing flow includes tasks of the other apparatus (e.g., PCs) connected to the MFP through a network in addition of the tasks of the MFP. As to the tasks, a range of the task is broadly considered, i.e., the task is considered as an executing unit of each of the applications or the MFPs. For example, in a case where the MFP performs scanning and transmission, two types of processing such as the scanning and the transmission are considered as tasks in the first exemplary embodiment, whereas the scanning and the transmission executed by the MFP is considered as a single task in the second exemplary embodiment.

A system illustrated in FIG. 7 includes a MFP 4, a processing flow management server 5 and a plurality of PCs 3, 7 and 8. The MFP 4, the processing flow management server 5 and the plurality of PCs are connected to each other through a LAN 6. The MFP 4 is an information processing apparatus which has, for example, a copying function and a facsimile function as well as a transmission function to read a document image and transmit thus read image data to the apparatus connected through the LAN 6. Further, the MFP 4 can receive a page description language (PDL) image instructed from the PC which is connected to the MFP 4 through the LAN 6 and prints the PDL image. Still further, the MFP 1 has a function to store thus read image data and the PDL image. The MFP 1 can print the stored image data and transmit the printed image data by using a facsimile machine. The MFP 4 has a function to combine these functions and registers the combined functions as a task of the MFP 4. Thus registered tasks are displayed on the operation unit 25 of the MFP 4 (see FIG. 2A) in the form of buttons. When the user clicks the button, the MFP 4 executes a function of the MFP 4 according to the set content of the task. The hardware configuration of the MFP 4 is identical to the MFP 1 which was described with reference to FIG. 2A.

The processing flow management server 5 is a management apparatus which manages the processing flow as a series of processing including tasks executed by a plurality of information processing apparatus (e.g., the MFP 4, the PCs 3, 7 and 8) which are connected to each other through the LAN 6. The hardware configuration of the processing flow management server 5 is identical to the PC 3 which is described above with reference to FIG. 3A. The PC 3 is an information processing apparatus identical to the PC 3 illustrated in FIG. 1. An image combining application and a signature application are installed in the PC 7 and the PC 8, respectively, of the information processing apparatus. The PCs 7 and 8 can execute the respective function according to a request from the other apparatus connected through the LAN 6. The hardware configurations of the PCs 7 and 8 are identical to the hardware configuration of the PC 3 described above with reference to FIG. 3A. As the management apparatus in the second exemplary embodiment of the present invention, an apparatus having a function of the processing flow management server 5 and functions of the MFP 4 and the PCs 3, 7 and 8 is applicable in addition to the processing flow management server 5.

Figure 8A:
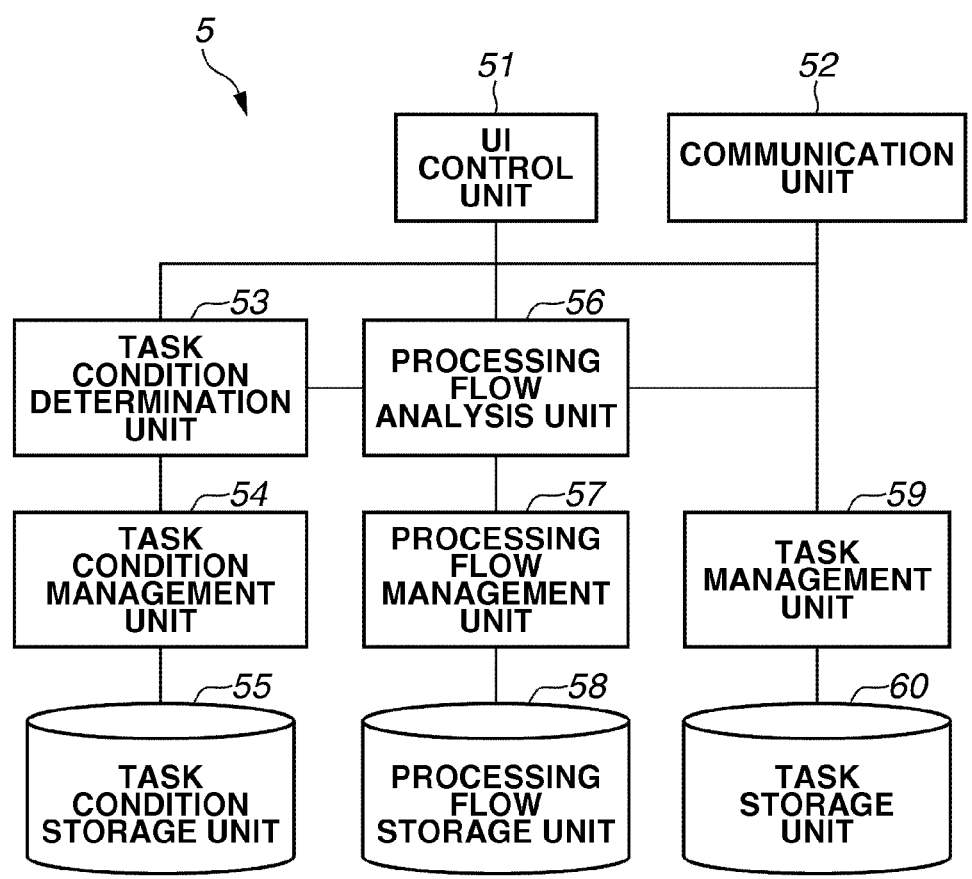

FIG. 8A illustrates an example of a functional block diagram of the processing flow management server. The processing flow management server 5 includes a UI control unit 51, a communication unit 52, a task condition determination unit 53, a task condition management unit 54, a task condition storage unit 55 and a processing flow analysis unit 56. Further, the processing flow management server 5 includes a processing flow management unit 57, a processing flow storage unit 58, a task management unit 59 and a task storage unit 60. The UI control unit 51 is configured to display various types of information. The UI control unit 51 also receives inputting by the user from a keyboard or a mouse and processes the input information. The communication unit 52 operates the network I/F (see FIG. 3A) to establish a communication. The task condition determination unit 53 is an image data acquisition unit which acquires image data (e.g., the scanned image data) from the information processing apparatus connected through the LAN 6 via the UI control unit 51 and the communication unit 52. The task condition determination unit 53 functions as a first search unit which searches a task condition indicated by the task condition management file stored in the task condition storage unit 55 based on the acquired image data. The task condition storage unit 55 is the first storage unit in the present exemplary embodiment. The task condition management file is a file having a task condition which is an execution condition of the task. More specifically, the task condition management file defines attribute information of the image data necessary for executing the task as the task condition. More specifically, the task condition determination unit 53 determines whether or not the attribute information held by the acquired scanned image data matches the task condition and acquires a task condition which matches the attribute information.

The task management unit 59 searches the task management file in the task storage unit 60 based on the task condition acquired by the task condition determination unit 53 and thereby functions as a second search unit which acquires a task corresponding to the task condition. The task storage unit 60 is the second storage unit in the present exemplary embodiment. The task storage unit 60 stores the task management file. The task management file is a file having corresponding information between the task condition and the task. The task management unit 59 searches the task management file and acquires, from among the tasks included in the processing flow which is acquired according to the search processing which the processing flow analysis unit 56 executes, a task which is executed by the information processing apparatus (e.g., the MFP 4) serving as an acquisition source of the scanned image data. Then, the task management unit 59 transmits the acquired task to the information processing apparatus which is the acquisition source of the scanned image data through the communication unit 52 as a transmission unit.

The task condition management unit 54 manages the task condition management file stored in the task condition storage unit 55. The task condition storage unit 55 stores the task condition management file. The processing flow analysis unit 56 divides the processing flow into tasks and submits a request for execution of the tasks to the application which is configured to execute the tasks. The processing flow analysis unit 56 controls an order of execution of tasks included in the processing flow. As an unique operation in the present exemplary embodiment, the processing flow analysis unit 56 functions as a third search unit which searches the processing flow management file in a third storage unit (i.e., the processing flow storage unit 58) based on the tasks acquired by the task management unit 59. The processing flow analysis unit 56 acquires the processing flow corresponding to the task. The processing flow management file is configured to have corresponding information between the processing flow and the task included in the processing flow. The processing flow management unit 57 manages the processing flow management file stored in the processing flow storage unit 58. The processing flow storage unit 58 stores the processing flow management file. A method for controlling the management apparatus of the present exemplary embodiment and a computer program thereof are realized by functions of the processing units of the processing flow management server 5 illustrated in FIG. 8A.

FIG. 8B illustrates an example of a functional block diagram of the MFP according to the second exemplary embodiment of the present invention. The MFP 4 includes a UI control unit 41, a communication unit 42, a task analysis unit 43, a task management unit 44, a task storage unit 45 and a function execution unit 46. The UI control unit 41 is configured to perform display on the operation unit 25 through the operation unit I/F 15 illustrated in FIG. 2A and process the inputting of the user through the operation unit 25. The communication unit 42 is configured to operate the network I/F 16 and the modem 17 illustrated in FIG. 2A to establish a communication. The task analysis unit 43 is configured to divide the task into tasks relating to the MFP 4 and issue an instruction for execution of tasks relating to the MFP 4 to the function execution unit 46. For example, in a case of the task for scanning and transmitting a document, the task analysis unit 43 divides the task into a task for scanning and a task for transmitting. The task management unit 44 is configured to manage the task management file stored in the task storage unit 45. The task storage unit 45 stores the task management file. The function execution unit 46 generates a task based on setting information of the tasks relating to the MFP 4 and executes the tasks.

FIGS. 9A, 9B and 9C illustrate examples of data configurations of a task condition management file, a processing flow management file and a task management file, respectively. FIG. 9A illustrates the data configuration of the task condition management file in the task condition storage unit 55. Each record (i.e., data of a single line) of the task condition management file indicates the respective task conditions. The task condition is a condition that the image data (e.g., the scanned image data) acquired by the processing flow management server 5 must satisfy when the task is executed. The task condition management file includes data items such as the task condition ID, the number, the resolution, the number of pages and the business form template ID. The task condition ID is identification information that uniquely identifies the task condition. The number represents the condition of the number of the scanned image data. For example, in order to execute the task condition which is represented by the task condition ID of 0001, the number of pieces of the scanned image data needs to be three. The resolution represents the resolution condition of the scanned image data. The number of pages represents the number of pages of the scanned image data. The business form template ID is identification information which uniquely identifies the business form template corresponding to each page of the scanned image data. In this example, in order to execute the task represented by the task condition ID of 0001, the first page of the scanned image data needs to be the business form template of temp_001 and the second page of the scanned image data needs to be the business form template of temp_002.

FIG. 9B illustrates the example of the data configuration of the processing flow management file in the processing flow storage unit 58. The processing flow management file includes data items such as a processing flow name, a work flow ID and a task list. The processing flow name represents a name of the processing flow. The work flow ID represents identification information which uniquely identifies the processing flow. The task list is a list for tasks included in the processing flow. When the processing flow is executed, the tasks listed in the task list are executed in number order. For example, when the processing flow A is executed, the task of task_001, the task of task_002 and the task of task_003 are executed in this order.

FIG. 9C illustrates the example of the data configuration of the task management file in the task storage unit 60. The task management file includes data items such as a task name, a task ID, a task execution target, a processing content and a task condition ID. The task name indicates a name of the task. The task ID is identification information that uniquely identifies the task. The task execution target represents, for example, an apparatus, an application or a Web service address for executing the task. The processing content represents a processing content of the task. The task condition ID is identical to the task condition ID in the task condition management file of FIG. 9A.

Figure 10:
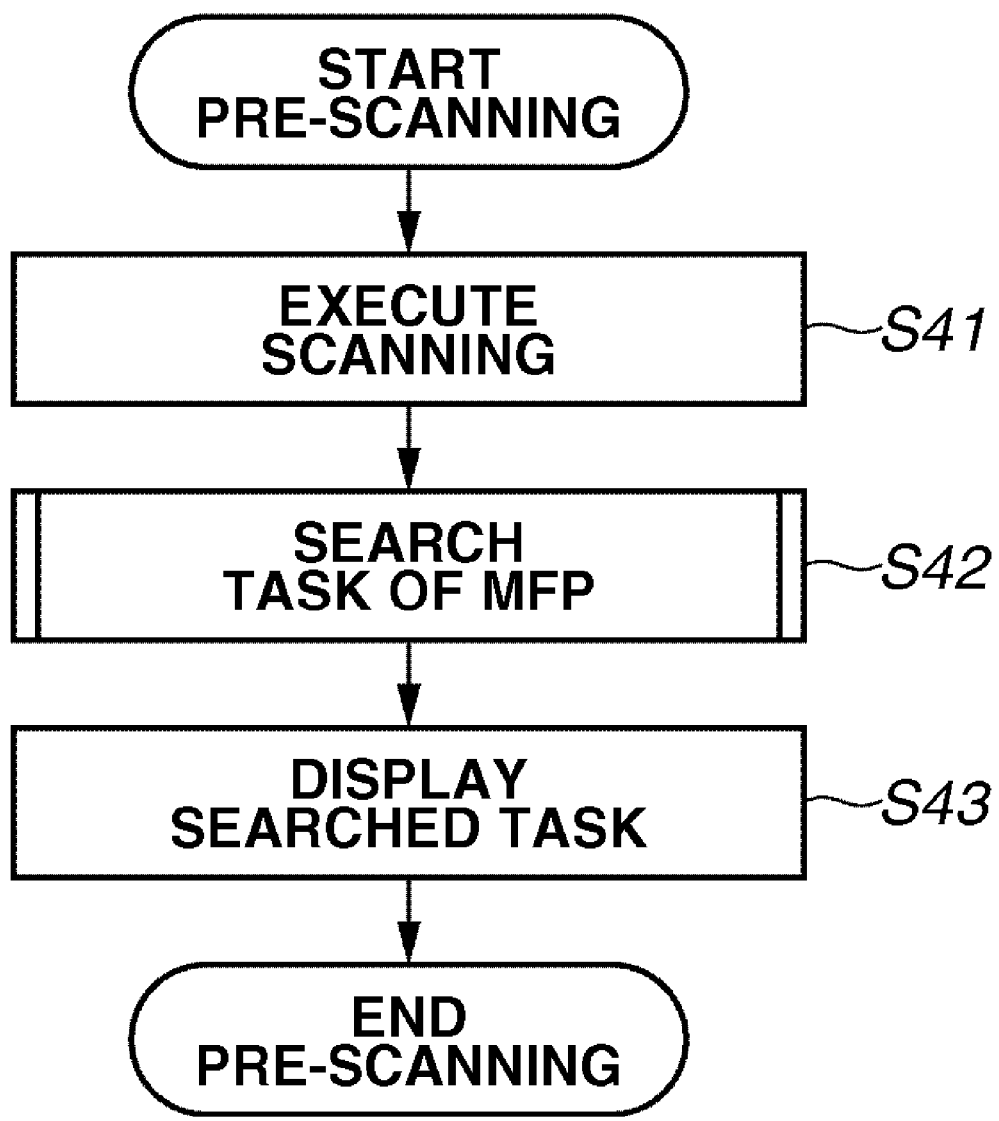
FIG. 10 illustrates an example of a search processing flow of a task in the MFP.

FIG. 10 illustrates an example of a search processing flow of the task of the MFP. In this example, the MFP 4 scans a document, transmits image data acquired by the scanning to the processing flow management server 5 and searches the processing flow including a task corresponding to the task condition that the image data satisfies. The UI control unit 41 of the MFP 4 (see FIG. 8B) displays an operation information input screen for executing the pre-scanning. When the user clicks a pre-scanning execution button on the operation information input screen, the UI control unit 41 issues an instruction for execution of the pre-scanning to the function execution unit 46. In step S41, the function execution unit 46 executes the scanning by default. In step S1, the function execution unit 46 passes the scanned image data acquired by the scanning to the task analysis unit 43.

Then, in step S42, the task analysis unit 43 searches the task of the MFP 4 by submitting a search request of the task of the MFP 4 to the processing flow management server 5. The task of the MFP 4, which is to be executed by the MFP 4, is included in the processing flow corresponding to the task having the task condition which the scanned image data satisfies. In step S43, the UI control unit 41 displays thus searched task. More specifically, the UI control unit 41 displays a task execution start button which starts execution of the searched task. The UI control unit 41 displays the task execution start button in the display form according to the coincidence flag corresponding to the task, similar to the display of the start button for processing flow execution described above with reference to FIG. 6B.

Figure 11:
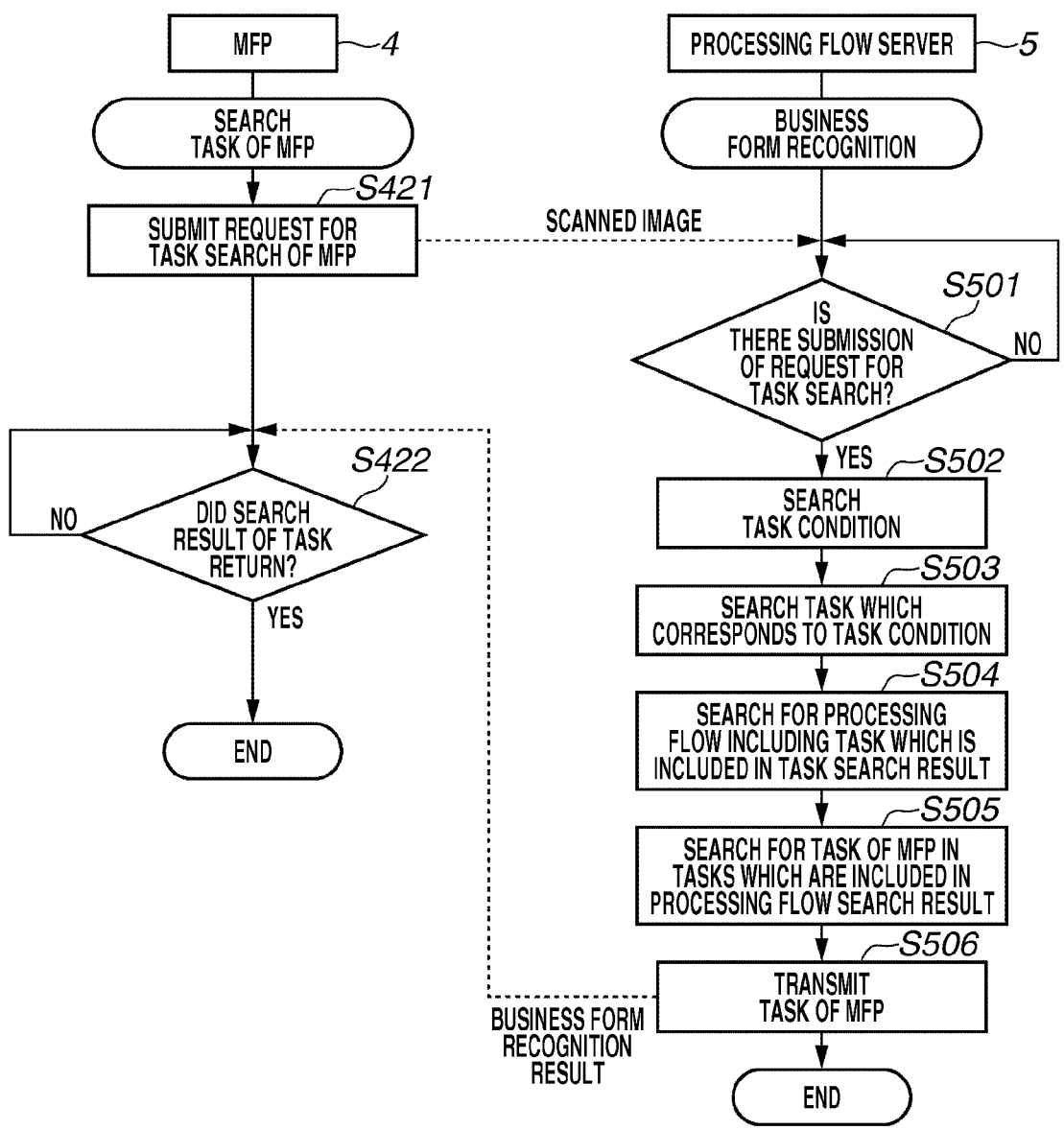
FIG. 11 illustrates search processing of the task in the MFP in detail.

FIG. 11 illustrates in detail the search processing of the task of the MFP in step S42 of FIG. 10. In step S42, the task analysis unit 43 of the MFP 1 transmits the scanned image data received from the function execution unit 46 in step S41 of FIG. 10 to the processing flow management server 5 through the communication unit 42 and submits the search request of the task of the MFP 4. The scanned image data is included in the search request of the task. In step S501, in the processing flow management server 5, the communication unit 52 monitors if there is the search request of the task submitted. In a case where there is the search request submitted (YES in step S501), the search request is passed to the task condition determination unit 53 and the processing proceeds to step S502. In a case where there is no search request submitted (NO in step S501), the communication unit 52 keeps monitoring.

Then, the task condition determination unit 53 acquires the task condition management file in the task condition storage unit 55 through the task condition management unit 54. Subsequently, in step S502, the task condition determination unit 53 determines a task condition which matches the scanned image data included in the search request, among the task conditions represented by the task condition management file. The processing in the step S502 is performed as described in detail below. Initially, the task condition determination unit 53 submits a request for the business form recognition to the PC 3 illustrated in FIG. 7 through the communication unit 52. Description is omitted with respect to the business form recognition processing performed by the PC 3 since it is identical to the business form recognition processing described above with reference to FIG. 6A. The communication unit 52 receives the business form recognition result from the PC 3 and passes the business form recognition result to the task condition determination unit 53. The task condition determination unit 53 refers to the task condition management file to search the task condition which matches the business form recognition result.

In this search processing, the task condition determination unit 53 refers to step S23 of FIG. 6A and thereby performs processing identical to the determination processing in which determination is made as to whether or not the business form recognition result matches the processing flow condition. In other words, the task condition determination unit 53 determines whether the business form recognition result completely matches or partially matches the task condition. The task condition determination unit 53 outputs as the search result of the task condition (an ID of) the task condition which completely matches or partially matches the business form recognition result and a coincidence flag indicating whether the task condition completely matches or partially matches.

Then, in step S503, the task management unit 59 refers to the task management file in the task storage unit 60 and thereby searches the task which corresponds to the task condition included in the search result of the task condition. For example, in a case where the task condition ID of 0001 is included in the task condition search result, the task of task_003 is retrieved as a task corresponding to the task condition ID in the task management file illustrated in FIG. 9C. The task management unit 59 passes the task ID of the retrieved task and a coincidence flag corresponding to the task, i.e., a coincidence flag included in the task condition search result, to the processing flow analysis unit 56 as the task search result. Subsequently, the processing flow analysis unit 56 acquires the processing flow management file in the processing flow storage unit 58 through the processing flow management unit 57. In step S504, the processing flow analysis unit 56 refers to the processing flow management file and thereby searches the processing flow including the task which is included in the task search result. In step S504, the processing flow analysis unit 56 further refers to the processing flow management file and thereby searches the task included in the searched processing flow. For example, in a case where the task ID included in the task search result was the task_0003, the processing flow including the task_003 in the task list is the processing flow A when referring to the processing flow management file illustrated in FIG. 9B. The processing flow analysis unit 56 outputs the task IDs of task_001, task_003 and task_002 included in this processing flow A as the processing flow search result. The processing flow analysis unit 56 passes this processing flow search result to the task management unit 59.

In step S505, the task management unit 59 refers to the task management file in the task storage unit 60 and thereby searches the task in which a task execution target is the MFP 4 among the tasks included in the processing flow search result. For example, the task IDs of the tasks included in the processing flow search result are task_001, task_003 and task_002. The task management unit 59 refers to the task management file of FIG. 9C and outputs the task of task_001 in which the task execution target is the MFP 4, as the search result of the task of the MFP 4. In step S506, the communication unit 52 transmits the search result of the task of the MFP 4 output by the task management unit 59 to the MFP 4. In a case where the searched task of the MFP 4 is included in the task search result according to the processing of the step S503, the communication unit 52 transmits the coincidence flag corresponding to the task together with the task of the MFP 4 to the MFP 4.

In step S422, in the MFP 4, the communication unit 42 monitors whether or not the search result of the task has returned from the processing flow management server 5. In a case where the search result of the task has returned (YES in step S422), the communication unit 42 passes the search result of the task to the task analysis unit 43 and the processing is ended. In a case where no search result of the task has returned (NO in step S422), the communication unit 42 keeps monitoring. According to the above described second exemplary embodiment of the present invention, a button for starting execution of the task the user desires can be displayed for execution of the subsequent processing only by scanning the document while the user is not aware of the search keyword.

OTHER EMBODIMENTS

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-181184 filed Aug. 4, 2009, which is hereby incorporated by reference herein in its entirety.

What is claimed is:

1. An information processing apparatus which executes a series of processing including a plurality of processes, comprising:
   a first storage unit configured to store attribute information of image data necessary for each of the series of processing as an execution condition of the series of processing;
   a second storage unit configured to store corresponding information between the execution condition of the series of processing and the series of processing;
   an image data acquisition unit configured to acquire image data;
   a first search unit configured to search an execution condition of the series of processing in the first storage unit based on the acquired image data and acquire the execution condition of the series of processing which corresponds to the attribute information of the image data;
   a second search unit configured to search the corresponding information in the second storage unit based on the execution condition of the series of processing acquired by the first search unit and acquire the series of processing which corresponds to the execution condition of the series of processing;
   a display unit configured to display information indicative of the series of processing acquired by the second search unit; and
   a business form recognition unit configured to execute business form recognition processing with respect to the image data acquired by the image data acquisition unit and acquire business form information as to a business form of the image data;
   wherein the attribute information of the image data includes business form information as to the business form of the image data; and
   wherein the first search unit acquires an execution condition of the series of processing, which corresponds to the business form information acquired by the business form recognition unit, among the execution conditions of the series of processing in the first storage unit,
   wherein the attribute information of the image data includes a resolution of the image data and business form information for every page which corresponds to the image data; and
   wherein the first search unit acquires an execution condition of the series of processing which matches the business form information acquired by the business form recognition unit based on the business form information acquired by the business form recognition unit, the resolution included in the attribute information of the image data and the business form information for every page included in the attribute information,
   wherein the first search unit determines whether the business form information acquired by the business form recognition unit completely matches, partially matches or does not match the execution condition of the series of processing; and
   wherein the display unit displays the information indicating the series of processing acquired by the second search unit in a display form according to the determination result as to the series of processing by the first search unit.

2. A management apparatus which manages a series of processing including tasks which composes processing executed by each of a plurality of information processing apparatus, the management apparatus comprising:
   a first storage unit configured to store attribute information of image data necessary for executing each of the tasks as an execution condition of the task;
   a second storage unit configured to store corresponding information between the execution condition of the task and the task;
   a third storage unit configured to store corresponding information between the series of processing and the task included in the series of processing;
   an image data acquisition unit configured to acquire the image data from the information processing apparatus;
   a first search unit configured to search the execution condition of the task in the first storage unit based on the acquired image data and acquire the execution condition of the task corresponding to attribute information of the image data;
   a second search unit configured to search the corresponding information in the second storage unit based on the execution condition of the task acquired by the first search unit and acquire the task corresponding to the execution condition of the task;
   a third search unit configured to search the corresponding information in the third storage unit based on the task acquired by the second search unit and acquire the series of processing corresponding to the task;
   a transmission unit configured to transmit the task executed by the information processing apparatus serving as an acquisition source of the image data, among the tasks included in the series of processing acquired by the third search unit, to the information processing apparatus; and
   a business form recognition unit configured to execute business form recognition processing with respect to the image data acquired by the image data acquisition unit and acquire business form information as to a business form of the image data;
   wherein the attribute information of the image data includes business form information as to the business form of the image data; and
   wherein the first search unit acquires an execution condition of the series of processing, which corresponds to the business form information acquired by the business form recognition unit, among the execution conditions of the series of processing in the first storage unit,
   wherein the attribute information of the image data includes a resolution of the image data and business form information for every page which corresponds to the image data; and
   wherein the first search unit acquires an execution condition of the series of processing which matches the business form information acquired by the business form recognition unit based on the business form information acquired by the business form recognition unit, the resolution included in the attribute information of the image data and the business form information for every page included in the attribute information, wherein the first search unit determines whether the business form information acquired by the business form recognition unit completely matches, partially matches or does not match the execution condition of the series of processing; and wherein the display unit displays the information indicating the series of processing acquired by the second search unit in a display form according to the determination result as to the series of processing by the first search unit.

3. The management apparatus according to claim 2:

wherein the information processing apparatus as the acquisition source of the image data receives the task transmitted by the transmission unit of the management apparatus and displays information indicating the task.

4. A method for controlling an information processing apparatus which executes a series of processing including a plurality of processes, the method comprising:

acquiring image data by the information processing apparatus which includes a first storage unit configured to store attribute information of image data necessary for each of the series of processing as an execution condition of the series of processing and a second storage unit configured to store corresponding information between the execution condition of the series of processing and the series of processing;

first searching for searching the execution condition of the series of processing in the first storage unit based on the acquired image data and thereby acquiring the execution condition of the series of processing corresponding to the attribute information of the image data;

second searching for searching the corresponding information in the second storage unit based on the execution condition of the series of processing acquired by the first searching processing and thereby acquiring a series of processing corresponding to the execution condition of the series of processing;

displaying information indicating the series of processing acquired by the second searching processing; and executing business form recognition processing with respect to the image data acquired and acquire business form information as to a business form of the image data;

wherein the attribute information of the image data includes business form information as to the business form of the image data; and wherein an execution condition of the series of processing is acquired, which corresponds to the business form information acquired, among the execution conditions of the series of processing, wherein the attribute information of the image data includes a resolution of the image data and business form information for every page which corresponds to the image data; and wherein an execution condition of the series of processing which matches the business form information is acquired based on the business form information acquired, the resolution included in the attribute information of the image data and the business form information for every page included in the attribute information, wherein determining whether the business form information completely matches, partially matches or does not match the execution condition of the series of processing; and wherein displaying the information indicating the series of processing acquired in a display form according to the determination result as to the series of processing.

5. A non-transitory computer readable storage medium which stores a program for executing the control method of claim 4.

6. A method for controlling a management apparatus which manages a series of processing including tasks, each of which is executed by each of a plurality of information processing apparatus, the method comprising:

acquiring image data from the information processing apparatus by the management apparatus which includes a first storage unit configured to store attribute information of image data necessary for executing each of the tasks as an execution condition of the task, a second storage unit configured to store corresponding information between the execution condition of the task and the task and a third storage unit configured to store corresponding information between the series of processing and the task included in the series of processing;

first searching for searching the execution condition of the task in the first storage unit based on the acquired image data and acquiring the execution condition of the task corresponding to the attribute information of the image data;

second searching for searching the corresponding information in the second storage unit based on the execution condition of the task acquired by the first searching processing and acquiring the task corresponding to the execution condition of the task;

third searching for searching the corresponding information in the third storage unit based on the task acquired by the second searching processing and acquiring the series of processing corresponding to the task;

transmitting the task executed by the information processing apparatus serving as an acquisition source of the image data, among the tasks included in the series of processing acquired by the third searching processing, to the information processing apparatus; and executing business form recognition processing with respect to the image data acquired and acquire business form information as to a business form of the image data;

wherein the attribute information of the image data includes business form information as to the business form of the image data; and wherein an execution condition of the series of processing is acquired, which corresponds to the business form information, among the execution conditions of the series of processing, wherein the attribute information of the image data includes a resolution of the image data and business form information for every page which corresponds to the image data; and wherein an execution condition of the series of processing which matches the business form information is acquired based on the business form information, the resolution included in the attribute information of the image data and the business form information for every page included in the attribute information, wherein determining whether the business form information acquired completely matches, partially matches or does not match the execution condition of the series of processing; and wherein displaying the information indicating the series of processing acquired in a display form according to the determination result as to the series of processing.

7. A non-transitory computer readable storage medium which stores a program for executing the control method of claim 6.

* * * * *